(12) United States Patent
Georgantas et al.

(10) Patent No.: US 8,112,047 B2
(45) Date of Patent: Feb. 7, 2012

(54) CONFIGURABLE RF TRANSMITTER

(75) Inventors: Theodoros Georgantas, Haidari (GR); Konstantinos D. Vavelidis, Ilioupoli (GR); Sofoklis Plevridis, Glyfada (GR); Ilias Bouras, Ilioupolis (GR)

(73) Assignee: Broadcom Corporation, Irvine, CA (US)

( * ) Notice: Subject to any disclaimer, the term of this patent is extended or adjusted under 35 U.S.C. 154(b) by 1044 days.

(21) Appl. No.: 12/022,264

(22) Filed: Jan. 30, 2008

(65) Prior Publication Data

US 2009/0191825 A1 Jul. 30, 2009

(51) Int. Cl.
*H04B 1/02* (2006.01)
(52) U.S. Cl. ..... 455/102; 455/108; 455/110; 455/127.2; 375/300; 375/302
(58) Field of Classification Search .................. 455/102, 455/108, 110, 118, 127.1, 127.2, 255–260, 455/341; 375/297, 300, 302, 345
See application file for complete search history.

(56) References Cited

U.S. PATENT DOCUMENTS

| | | | | |
|---|---|---|---|---|
| 5,469,105 A | * | 11/1995 | Sparks | 330/129 |
| 7,126,999 B2 | * | 10/2006 | Dent | 375/261 |
| 7,292,618 B2 | * | 11/2007 | Tal et al. | 375/132 |
| 7,693,496 B2 | * | 4/2010 | Lewis | 455/108 |
| 7,809,338 B2 | * | 10/2010 | Tsfati | 455/76 |
| 2005/0190854 A1 | * | 9/2005 | Shakeshaft et al. | 375/295 |

* cited by examiner

*Primary Examiner* — Nhan Le
(74) *Attorney, Agent, or Firm* — Garlick Harrison & Markison; Kevin L. Smith

(57) ABSTRACT

An RF transmitter includes a Cartesian to polar conversion section, a PLL, a DAC module, a mixing module, and a PA module. The Cartesian to polar conversion section converts a Cartesian based symbol stream into a polar based symbol stream. The PLL generates an oscillation when the RF transmitter is in a Cartesian mode or a phase modulated oscillation based on phase modulation information of the polar based symbol stream when the RF transmitter is in a polar mode. The mixing module mixes an analog Cartesian based signal with a local oscillation to produce a Cartesian based up converted signal when the RF transmitter is in the Cartesian mode and mixes an analog amplitude signal with a phase modulated local oscillation to produce a polar based up converted signal when the RF transmitter is in the polar mode. The PA module amplifies the Cartesian based up converted signal to produce an outbound RF signal when the RF transmitter is in the Cartesian mode and amplifies the polar based up converted signal to produce the outbound RF signal when the RF transmitter is in the polar mode.

20 Claims, 9 Drawing Sheets

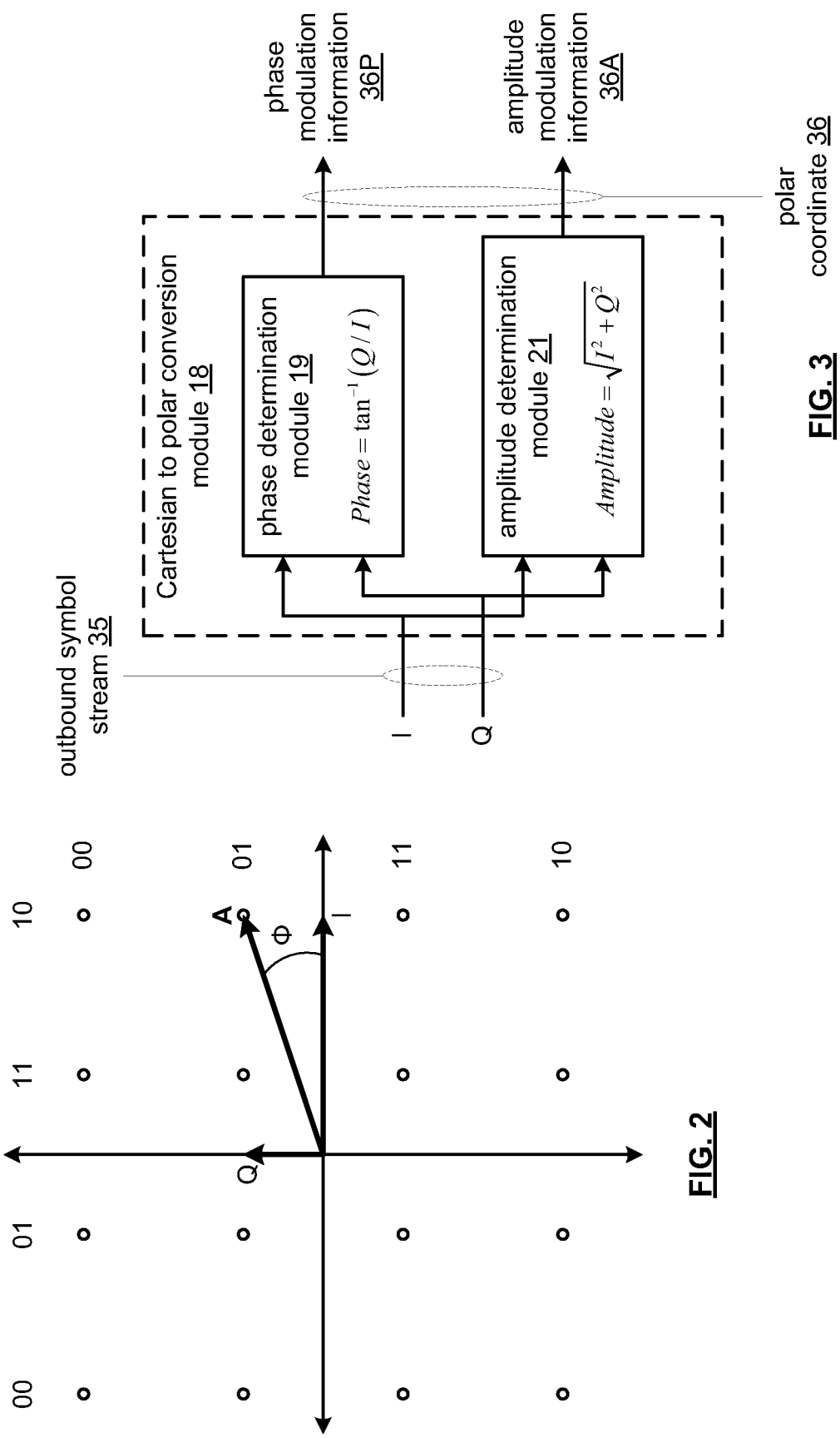

CONFIGURABLE RF TRANSMITTER

CROSS REFERENCE TO RELATED PATENTS

Not applicable

STATEMENT REGARDING FEDERALLY SPONSORED RESEARCH OR DEVELOPMENT

Not applicable

INCORPORATION-BY-REFERENCE OF MATERIAL SUBMITTED ON A COMPACT DISC

Not applicable

BACKGROUND OF THE INVENTION

1. Technical Field of the Invention

This invention related generally to wireless communication systems and more particularly to radio frequency (RF) transmitters that may be used within such wireless communication systems.

2. Description of Related Art

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards including, but not limited to, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), radio frequency identification (RFID), and/or variations thereof.

Depending on the type of wireless communication system, a wireless communication device, such as a cellular telephone, two-way radio, personal digital assistant (PDA), personal computer (PC), laptop computer, home entertainment equipment, RFID reader, RFID tag, et cetera communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system or a particular RF frequency for some systems) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

For each wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the receiver is coupled to the antenna and includes a low noise amplifier, one or more intermediate frequency stages, a filtering stage, and a data recovery stage. The low noise amplifier receives inbound RF signals via the antenna and amplifies then. The one or more intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

As is also known, the transmitter includes a data modulation stage, one or more intermediate frequency stages, and a power amplifier. The data modulation stage converts raw data into baseband signals in accordance with a particular wireless communication standard. The one or more intermediate frequency stages mix the baseband signals with one or more local oscillations to produce RF signals. The power amplifier amplifies the RF signals prior to transmission via an antenna.

Currently, there are two basic types of RF transmitters: Cartesian based transmitter and a Polar coordinate based transmitter. A Cartesian based transmitter includes baseband processing and RF transmission circuitry. The baseband processing encodes, punctures, maps, interleaves, and domain converts outbound data into an in-phase (I) signal component and a quadrature (Q) signal component. For example, if the baseband processing utilizes a 64 quadrature amplitude modulation (QAM) scheme, a first outbound data value of 101 may be ½ rate encoded into a value of 11 10 01 and a second outbound data value of 011 may be ½ rate encoded into a value of 00 11 01. After puncturing, the encoded values may be interleaved to produce a first interleaved value of 10 11 01 and a second interleaved value of 01 10 01. The first interleaved value is mapped into an I value of 101 and a Q value of 101 and the second interleaved value is mapped into an I value of 011 and a Q value of 001. Each pair of mapped I and Q interleaved values are converted into time domain signals via an inverse fast Fourier transform (IFFT) for a corresponding sub multiple carrier of the signaling protocol (e.g., orthogonal frequency division multiplexing [OFDM]). The time domain I and Q signals are converted into analog signals via an analog to digital converter to produce the I signal component and the Q signal component.

The RF transmission circuitry includes a local oscillator, a mixing section, a linear power amplifier, and may include RF filtering. For direct conversion transmitters, the local oscillator generates an I local oscillation and a Q local oscillation, which are respectively mixed with the I signal component and the Q signal component via the mixing section. The resulting I mixed signal and Q mixed signal are summed to produce an RF signal. The linear power amplifier amplifies to the RF signal to produce an amplified RF signal that may be subsequently bandpass filtered prior to transmission.

While a Cartesian based RF transmitter provides the advantage of a single side band transmitter (i.e., do not have negative frequencies associated with I and Q signals), the transmitter path (i.e., the mixing section and the power amplifier) needs to be linear to avoid data corruption and spurious emissions that affect nearby transmitters and/or receives. In particular, the linearity requirement limits the output power of the power amplifier.

A Polar coordinate based transmitter includes baseband processing and RF transmission circuitry. The baseband processing encodes, punctures, maps, interleaves, and domain converts outbound data into polar coordinates of an amplitude (A) and a phase (Φ). For example, if the baseband processing utilizes a 64 quadrature amplitude modulation (QAM) scheme, an a first outbound data value of 101 may be ½ rate encoded into a value of 11 10 01 and a second outbound data value of 011 may be ½ rate encoded into a value of 00 11 01. After puncturing, the encoded values may be interleaved to produce a first interleaved value of 10 11 01 and a second interleaved value of 01 10 01. The first interleaved value is mapped into an amplitude value of $A_0$ and a phase value of $\Phi_0$ and the second interleaved value is mapped into an amplitude value of $A_1$ and a phase value of $\Phi_1$.

The RF transmission circuitry includes a local oscillator and a power amplifier. The local oscillator includes a phase locked loop (PLL) that generates a local oscillation at a desired RF frequency that is modulated based on phase values $\Phi_0$ and $\Phi_1$. The phase modulated RF signal is then amplitude modulated by the power amplifier in accordance with the amplitude values $A_0$ and $A_1$ to produce a phase and amplitude modulated RF signal.

While the Polar coordinate RF transmitter provides the advantages of reduced RF filtering due to the response of the PLL and the potential use of a non-linear power amplifier (which, for the same die area, is capable of greater output power than a linear power amplifier), there are some potential disadvantages. For instance, the response of the PLL may be narrow, thus limiting the RF transmitter to narrow band communication standards. Further, maintaining synchronization between the phase values and the amplitude values can be difficult due to the delays within the PLL. Still further, the baseband processing is utilizing real signals, thus has to account for potential negative frequencies.

Therefore, a need exists for a transmitter that can operate as a Cartesian RF transmitter and/or a Polar coordinate transmitter to capitalize on the advantages of the particular type of transmitter.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

BRIEF DESCRIPTION OF THE SEVERAL VIEWS OF THE DRAWING(S)

FIG. 2 is a diagram of an example of an outbound symbol in accordance with the present invention;

FIG. 3 is a schematic block diagram of an embodiment of a Cartesian to polar conversion module in accordance with the present invention;

DETAILED DESCRIPTION OF THE INVENTION

Figure 1:
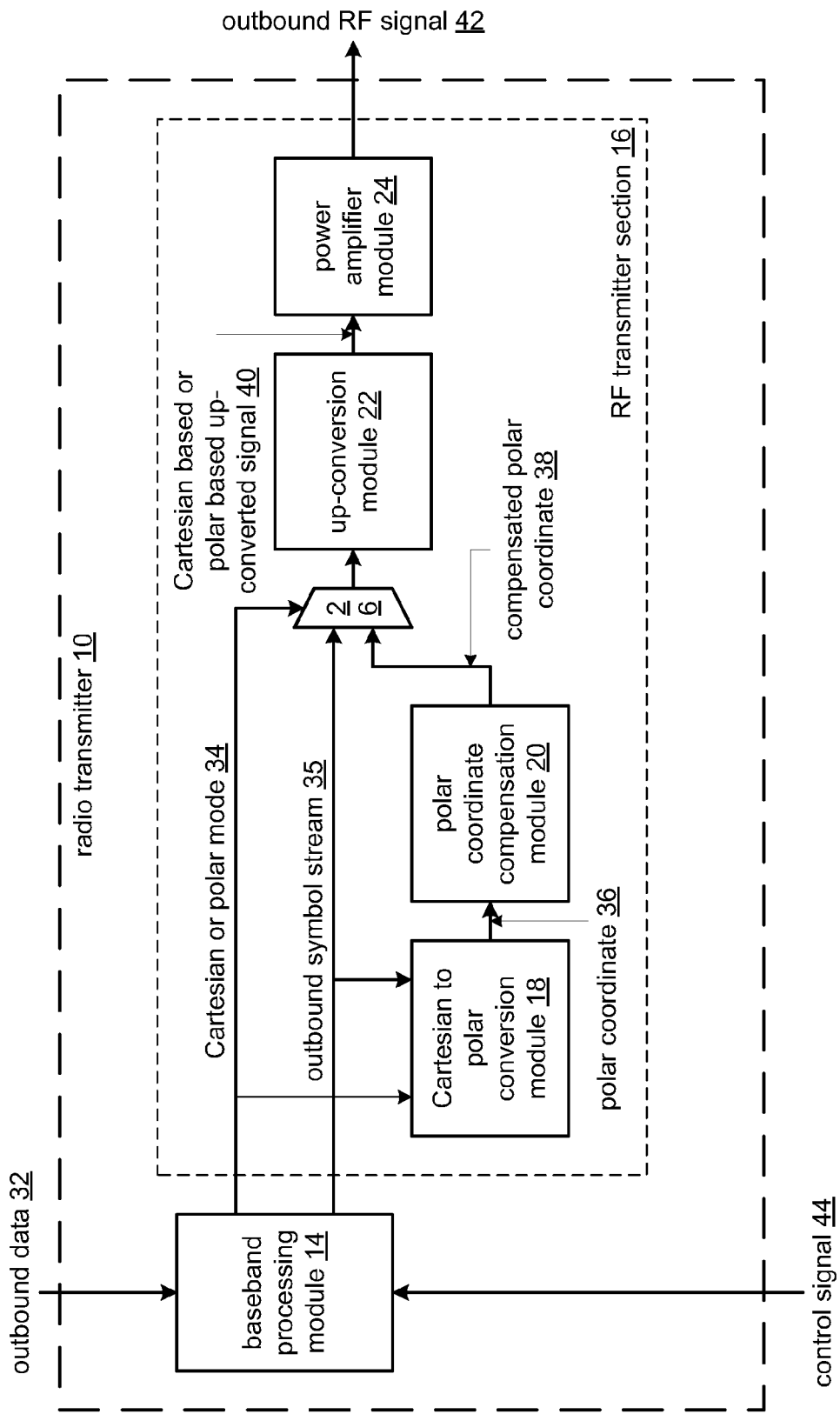
FIG. 1 is a schematic block diagram of an embodiment of a radio transmitter in accordance with the present invention.

FIG. 1 is a schematic block diagram of an embodiment of a radio transmitter 10 that includes a baseband processing module 14 and a radio frequency (RF) transmitter section 16, which includes a Cartesian to polar conversion module 18, a polar coordinate compensation module 20, an up-conversion module 22, a power amplifier module 24 and multiplexing circuitry 26. The baseband processing module 14 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module may have an associated memory and/or memory element, which may be a single memory device, a plurality of memory devices, and/or embedded circuitry of the processing module. Such a memory device may be a read-only memory, random access memory, volatile memory, non-volatile memory, static memory, dynamic memory, flash memory, cache memory, and/or any device that stores digital information. Note that when the processing module implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Further note that, the memory element stores, and the processing module executes, hard coded and/or operational instructions corresponding to at least some of the steps and/or functions illustrated in FIGS. 1-11.

In operation, the baseband processing module 14 converts outbound data 32 (which may be a voice signal, a data signal, a graphics signal, a video signal, and/or a text signal) into an outbound symbol stream 35 in accordance with a wireless communication protocol (e.g., GSM, CDMA, wideband CDMA (WCDMA), high-speed downlink packet access (HS-DPA), high-speed uplink packet access (HSUPA), Enhanced Data rates for GSM Evolution (EDGE), General Packet Radio Service (GPRS), wi-max, wi-fi, etc.). In an embodiment, the baseband processing module 14 may perform one or more of scrambling, encoding, constellation mapping, modulation, frequency spreading, frequency hopping, beam-forming, space-time-block encoding, space-frequency-block encoding, and/or digital baseband to IF conversion to convert the outbound data 32 into the outbound data symbol stream 35.

In addition, the baseband processing module 14 generates a Cartesian or polar mode signal 34, which may be generated on a packet-by-packet basis, group of packets basis, or a communication basis. For example, for each packet of outbound data 32 received by the baseband processing module 14, the baseband processing module may determine whether the RF transmitter section 16 is to process the outbound symbol stream 35 of the packet as polar coordinates or Cartesian coordinates. The baseband processing module 14 may determine the mode 34 (e.g., polar or Cartesian) based on the wireless communication protocol and/or based on a control signal 44 received from a host device (e.g., a microprocessor supporting an operating system of a device and/or user applications executed by the device) or a higher communication layer processing module (e.g., data link layer, network layer, transport layer, session layer, presentation layer, and/or application layer).

When the baseband processing module 14 generates the Cartesian or polar mode signal 34 to indicate a Cartesian mode, the Cartesian to polar conversion module 18 and the polar coordinate compensation module 20 are disabled. In this mode, the multiplexing circuitry 26, which is symbolic of a providing one or another signal to another module that can be done via an electrical connection where only one path is enabled, via a multiplexer, and/or via any circuit that allows selection of one signal from a plurality of signals, provides the outbound symbol stream 35 as Cartesian coordinates (e.g., an I component and a Q component for each symbol) to the up-conversion module 22.

The up-conversion module 22 converts the Cartesian coordinate based outbound symbol stream 35 into a Cartesian based up converted signal 40. The power amplifier module 24, which includes one or more power amplifier drivers and/or one or more power amplifiers coupled in series and/or in parallel, amplifies the Cartesian based up converted signal 40 to produce an outbound RF signal 42.

When the baseband processing module 14 generates the polar mode control signal 36, the Cartesian to polar conversion module 18 converts an in-phase component and a quadrature component of the outbound symbol stream 35 into at least one polar coordinate 36. As an example, the Cartesian to polar conversion module 18 converts each symbol of the stream 35 into a corresponding polar coordinate 36 as will be further described with reference to FIG. 3.

The polar coordinate compensation module 20 compensates the at least one polar coordinate 36 based on at least one of timing errors, amplitude distortion, and phase distortion to produce at least one compensated polar coordinate 38. Note that the Cartesian to polar conversion module 18 and the polar coordinate compensation module 20 may each be a separate processing device(s) from the baseband processing module 14 or embodied within the same processing device(s).

In this mode, the multiplexing circuitry 26 provides the compensated polar coordinate 38 to the up-conversion module 22, which converts the at least one compensated polar coordinate 38 into a polar based up-converted signal 40. The power amplifier module 24 amplifies the polar based up-converted signal 40 to produce the outbound RF signal 42.

FIG. 2 is a diagram of an example of mapping an encoded value into Cartesian coordinates and/or into Polar coordinates. In this example, the mapping corresponds to a 16 QAM scheme and the encode value is 10 01. For mapping into Cartesian coordinates, the encoded value is converted into an in-phase (I) component and a quadrature component (Q). For this example, the I component is 10 and the Q component is 01. When the I and Q components are converted into time domain signals, the I component may be expressed as $A_I$ $\cos(\omega_{do}t)$ and the Q component may be expressed as $A_Q$ $\sin(\omega_{do}t)$, where, for this example, $A_I$ is based on 10 and $A_Q$ is based on 01.

In the example of FIG. 2, the encoded value of 10 01 may be mapped into Polar coordinates as a vector of magnitude A and phase Φ. In the time domain, the Polar coordinate representation of the encoded value may be expressed as A cos(Φ). Note that the Polar coordinates may be directly determined from the encoded value or based on the amplitudes of the I and Q components, where (Q is the amplitude of the Q component and I is the amplitude of the I component):

Phase(Φ)=$\tan^{-1}(Q/I)$

Amplitude(A)=$\sqrt{I^2+Q^2}$

FIG. 3 is a schematic block diagram of an embodiment of a Cartesian to polar conversion module 18 that includes a phase determination module 19 and an amplitude determination module 21. In this embodiment, the phase determination module 19 determines the phase information 36P as $\tan^{-1}(Q/I)$, where Q represents the magnitude of the Q component and I represents the magnitude of the I component. The amplitude determination module 21 determines the amplitude information 36A as $(I^2+Q^2)^{1/2}$, where Q represents the magnitude of the Q component and I represents the magnitude of the I component.

Figure 4:
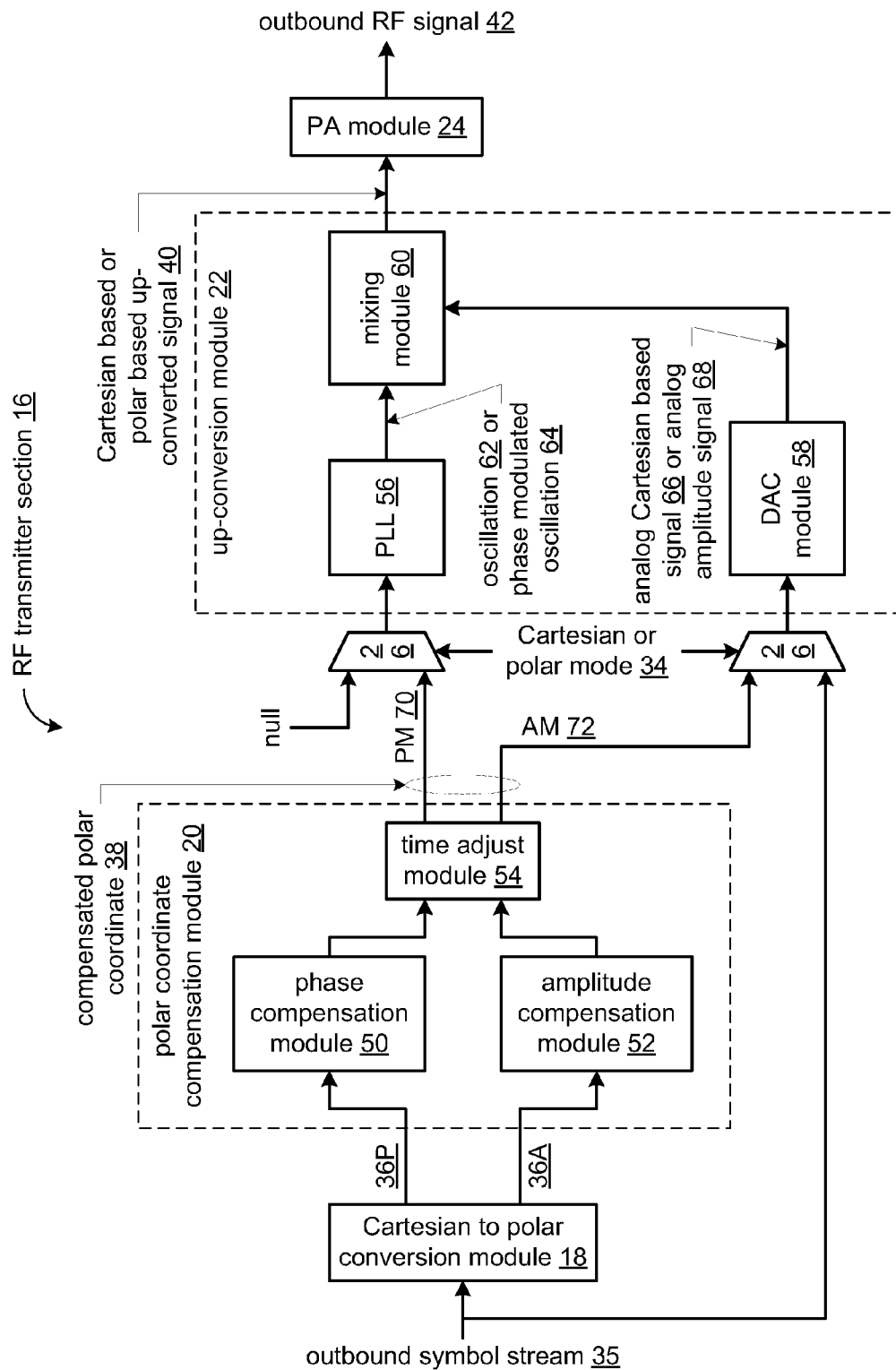
FIG. 4 is a schematic block diagram of an embodiment of an RF transmitter section in accordance with the present invention.

FIG. 4 is a schematic block diagram of an embodiment of an RF transmitter section 16 that includes the Cartesian to polar conversion module 18, the polar coordinate compensation module 20, the up-conversion module 22, and the power amplifier module 24. The polar coordinate compensation module 20 includes a phase compensation module 50, an amplitude compensation module 52, and a time adjust module 54. The up-conversion module 22 includes a phase locked loop (PLL) 56, a digital to analog conversion module 58, and a mixing module 60.

In operation, the Cartesian to polar conversion module 18 converts the outbound symbol stream 35 into at least one polar coordinate 36 having phase modulation information 36P and amplitude modulation information 36A. The Cartesian to polar conversion module 18 provides the phase modulation information 36P to the phase compensation module 50 and provides the amplitude modulation information 36A to the amplitude compensation module 52.

The phase compensation module 50 compensates for phase distortion of the phase modulation information 36P of the polar coordinate to produce compensated phase modulation information 70. The phase distortion may result from non-ideal components within the Cartesian to polar conversion module 18, non-ideal components within the baseband processing module 14, approximations made in the mapping of the outbound data to a symbol, approximations made in the conversion from Cartesian coordinates to polar coordinates, and/or any other source for error that would cause distortion of the phase modulation information 36P. For example, the non-idealities of the PLLs associated with the up-conversion module include PLL bandwidth limitations, VCO-Kv (e.g., gain) non-linearities, etc.

The amplitude compensation module 52 compensates for amplitude distortion of amplitude modulation information 36A of the polar coordinate to produce compensated amplitude modulation information 72. The amplitude distortion may result from non-ideal components within the Cartesian to polar conversion module 18, non-ideal components within the baseband processing module 14, approximations made in the mapping of the outbound data to a symbol, approximations made in the conversion from Cartesian coordinates to polar coordinates, and/or any other source for error that would cause distortion of the amplitude modulation information 36A. For instances, the mixing modules 60 introduce non-linearities, etc.

Due to the different paths for generating the phase modulation information and the amplitude modulation information and the different compensation paths for each, the AM information may be out of step in time with the PM information. In an embodiment, the time adjust module 54 resolves this issue by substantially synchronizing the compensated amplitude modulation information 72 and the compensated phase modulation information 70 to produce the compensated polar coordinate 38.

When the RF transmitter 10 is the Cartesian mode, the PLL receives null phase information via the multiplexer circuitry 26, which may be achieved by providing a null input via a multiplexer circuit or by having the Cartesian to polar conversion module 18 off such that the resulting compensated phase modulation information 70 is zero. Regardless of how the PLL receives the null phase information, it generates an oscillation 62 and provides it, or a representation thereof (e.g., a frequency multiple of the oscillation, a frequency division of the oscillation, etc.), to the mixing module 60.

The DAC module 58, which may include one or more digital to analog converters, convert the Cartesian based symbol stream 35 into an analog Cartesian based signal 66. For example, the DAC module 58 may include a Q digital to analog converter (DAC) to convert a Q component of a symbol of the stream 35 into an analog Q component signal and a second DAC to convert an I component of a symbol of the stream 35 into an analog I component signal.

The mixing module 60, which may include a pair mixers and a combining module, mixes the analog Cartesian based signal 66 with a local oscillation to produce the Cartesian based up-converted signal 40. Note that the local oscillation is derived from the oscillation. For example, the oscillation 62 may have a frequency of 600 MHz that is divided by two and then the two oscillations are combined to produce the local oscillation having a frequency of 900 MHz.

When the RF transmitter 16 is in the polar mode, the multiplexing circuitry 26 provides the compensated phase modulation information 70 to the PLL 56 and the compensated amplitude modulation information 72 to the DAC module 58. The PLL 56 generates a phase modulated oscillation 64 based on the compensated phase modulation information 70. The DAC module 58 converts the compensated amplitude modulation information 72 into an analog amplitude signal 68.

In this mode, the mixing module mixes the analog amplitude signal 68 with a phase modulated local oscillation 64 to produce the polar based up-converted signal 40. Note that the phase modulated local oscillation is derived from the phase modulated oscillation 64.

In another embodiment, the PLL 56 may generate the oscillation within a first frequency band (e.g., 800-900 MHz) when the RF transmitter is in a first Cartesian mode and generate the oscillation within a second frequency band (e.g., 1700-2100 MHz) when the RF transmitter is in a second Cartesian mode. In addition, the PLL 56 may generate the phase modulated oscillation within the first frequency band (e.g., 800-900 MHz) based on the phase modulation information of the polar based symbol stream when the RF transmitter is in a first polar mode and generate the phase modulated oscillation within the second frequency band (e.g., 1700-2100 MHz) based on the phase modulation information of the polar based symbol stream when the RF transmitter is in a second polar mode.

Figure 5:
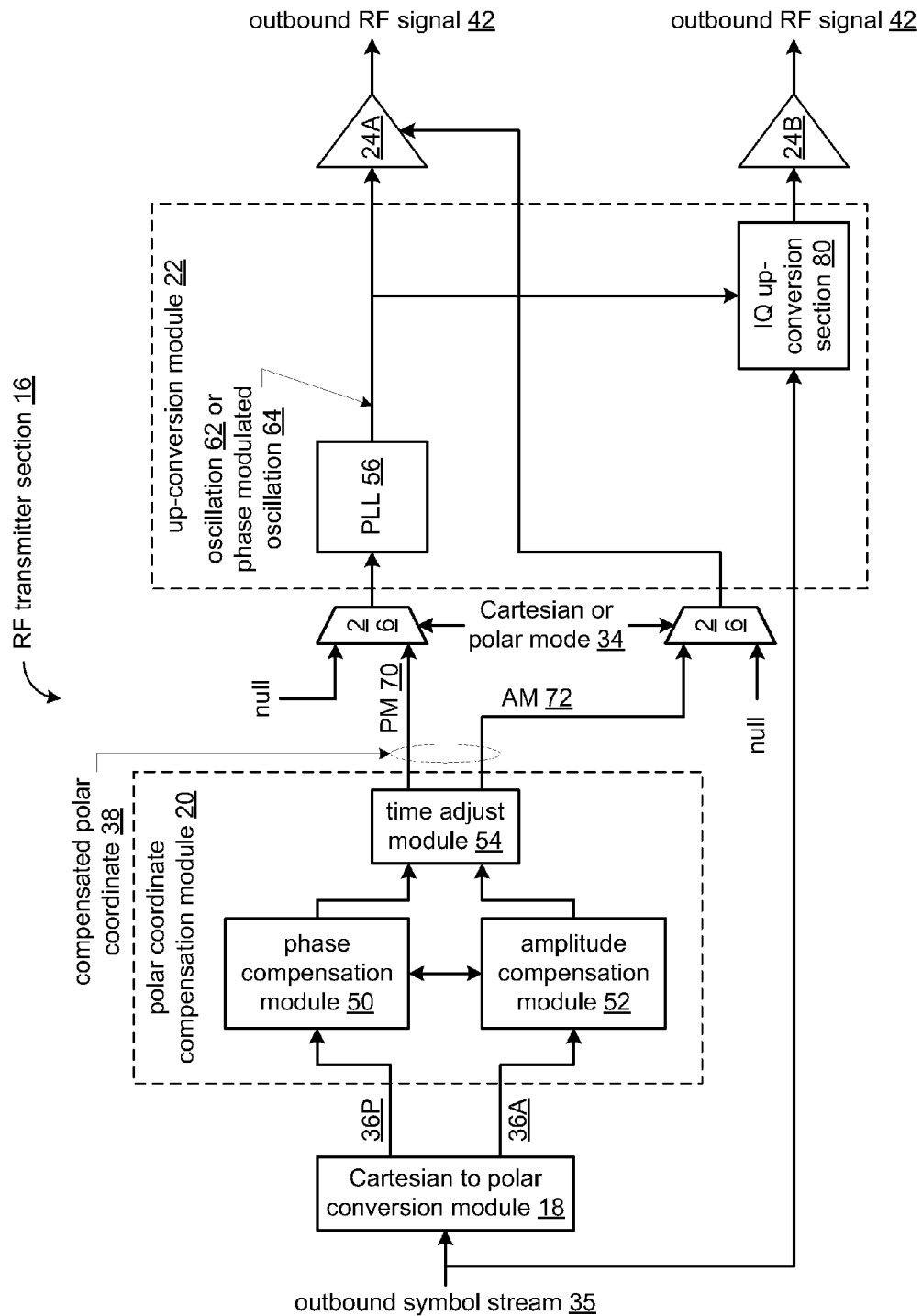
FIG. 5 is a schematic block diagram of another embodiment of an RF transmitter section in accordance with the present invention.

FIG. 5 is a schematic block diagram of another embodiment of an RF transmitter section 16 that includes the Cartesian to polar conversion module 18, the polar coordinate compensation module 20, the up-conversion module 22, and the power amplifier module 24. The polar coordinate compensation module 20 includes the phase compensation module 50, the amplitude compensation module 52, and the time adjust module 54. The up-conversion module 22 includes the PLL 56 and an IQ up-conversion section 80. The power amplifier module 24 includes a first power amplifier circuit 24A and a second power amplifier circuit 24B.

In operation, the Cartesian to polar conversion module 18 converts the outbound symbol stream 35 into at least one polar coordinate 36 having phase modulation information 36P and amplitude modulation information 36A when the RF transmitter section 16 is in the polar mode. The Cartesian to polar conversion module 18 provides the phase modulation information 36P to the phase compensation module 50 and provides the amplitude modulation information 36A to the amplitude compensation module 52. The phase compensation module 50, the amplitude compensation module 52 and the time adjust module 54 function as previously discussed to produce at least one compensated polar coordinate 38, which includes compensated phase modulation information 70 and compensated amplitude modulation information 72.

With the RF transmitter in the polar mode, the up-conversion module 22 receives the compensated phase modulation information 70 via the PLL 56 and passes, via a digital to analog converter, the compensated amplitude modulation information 72 to the first power amplifier circuit 24A. The PLL 56 generates the phase modulated oscillation 64 based on the compensated phase modulation information 70 and provides it to the first power amplifier circuit 34A. Note that in this mode, the IQ up-conversion section 80 is inactive.

The first power amplifier circuit 24A amplifies the phase modulated oscillation 64 based on the compensated amplitude modulation information 72 to produce the outbound RF signal 42. In an embodiment, the first power amplifier circuit 24A includes one or more power amplifier drivers and/or one or more power amplifiers coupled in series and/or in parallel.

When the RF transmitter is in the Cartesian mode, the Cartesian to polar conversion module and the polar coordinate compensation module 20 are inactive. As such, the PLL generates an oscillation 62 in the absence of the compensated phase modulation information 72. The absence of the compensated phase modulation information 72 may be achieved by providing a null signal, by having the polar coordinate compensation module 20 disabled, or by any other means to prevent phase modulation of the oscillation 62.

The an IQ up-conversion section 80 generates the Cartesian up-converted signal based on the outbound symbol stream 35 and the oscillation 62 coupled to, in accordance with the Cartesian mode signal. In an embodiment, the IQ up-conversion module 80 mixes an analog in-phase component of a local oscillation with an analog representation of the in-phase component of the outbound symbol stream 35 to produce a first mixed signal and mixes an analog quadrature component of the local oscillation with an analog representation of the quadrature component of the outbound symbol stream 35 to produce a second mixed signal. The IQ up-conversion module section 80 then combines the first and second mixed signals to produce the Cartesian based up-converted signal. In addition, the up-conversion module 22 may derive the local oscillation from the oscillation 62. For example, the oscillation 62 may have a frequency of 600 MHz that is divided by two and then the two oscillations are combined to produce the local oscillation having a frequency of 900 MHz.

The second power amplifier circuit 24B amplifies the Cartesian up-converted signal to produce the outbound RF signal 42. In an embodiment, the second power amplifier circuit 24B includes one or more power amplifier drivers and/or one or more power amplifiers coupled in series and/or in parallel.

In another embodiment, the PLL 56 may generate the oscillation within a first frequency band (e.g., 800-900 MHz) when the RF transmitter is in a first Cartesian mode and generate the oscillation within a second frequency band (e.g., 1700-2100 MHz) when the RF transmitter is in a second Cartesian mode. In addition, the PLL 56 may generate the phase modulated oscillation within the first frequency band (e.g., 800-900 MHz) based on the phase modulation information of the polar based symbol stream when the RF transmitter is in a first polar mode and generate the phase modulated oscillation within the second frequency band (e.g., 1700-2100 MHz) based on the phase modulation information of the polar based symbol stream when the RF transmitter is in a second polar mode.

Figure 6:
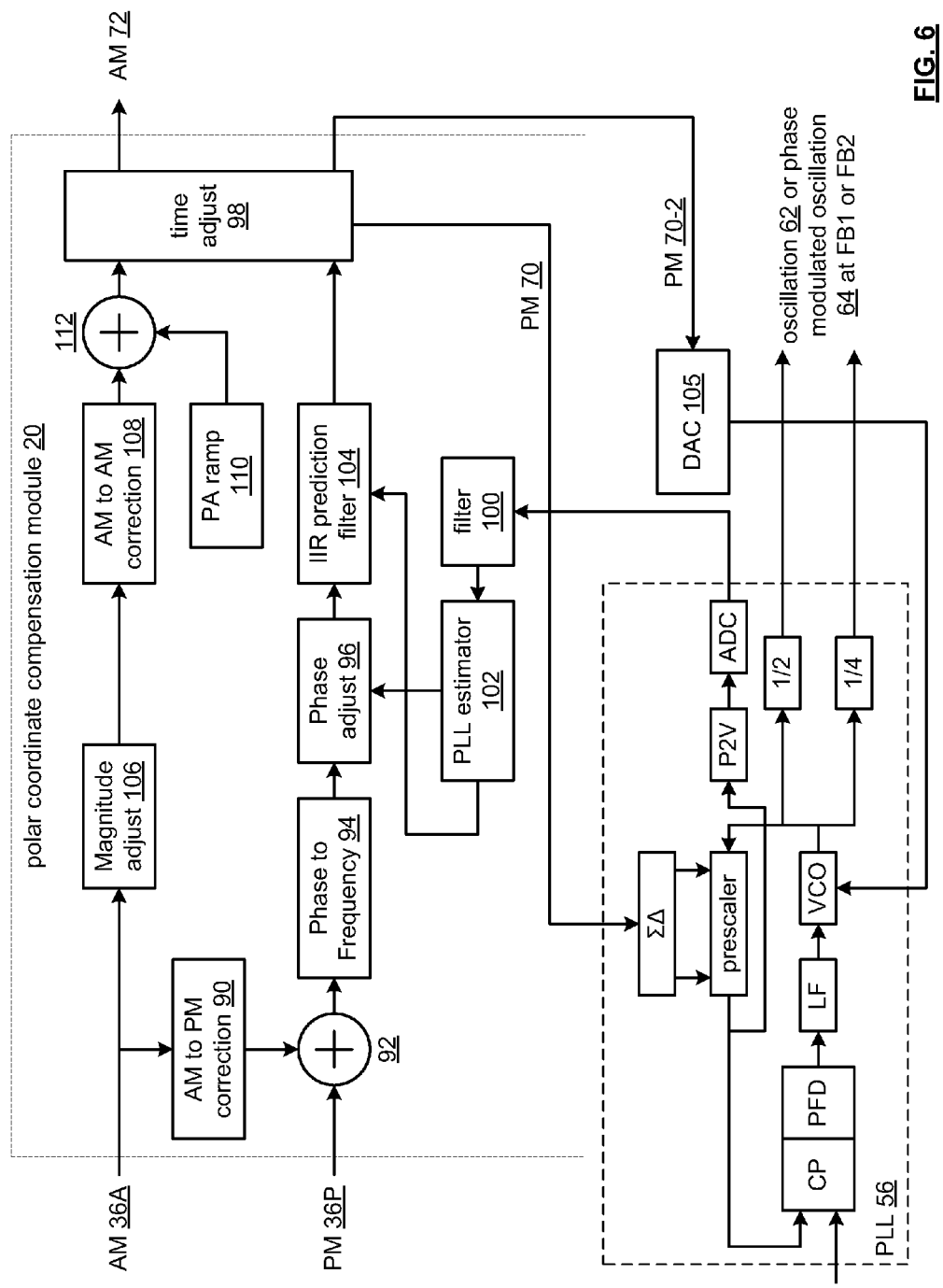
FIG. 6 is a schematic block diagram of an embodiment of polar compensation module and a PLL in accordance with the present invention.

FIG. 6 is a schematic block diagram of an embodiment of polar compensation module 20 and the PLL 56. The polar compensation module 20 includes a first amplitude modulation (AM) to phase modulation (PM) correction module 90, a first summing module 92, a phase to frequency module 94, a phase adjust module 96, a timing adjust module 98, a filter 100, a PLL estimator 102, an IIR (infinite impulse response) prediction filter 104, a magnitude adjust module 106, an AM to AM correction module 108, a power amplifier ramp module 110, and a second summing module 112. In an embodiment, the amplitude compensation module includes modules 106, 108, 110, and 112 while the phase compensation module includes modules 90, 92, 94, 96, and 104.

The PLL 56 includes a charge pump (CP), a phase-frequency detector (PFD), a loop filter (LF), a voltage controlled oscillator (VCO), a prescaler divider module, a sigma delta modulator (ΣΔ), a phase to voltage module (P2V), an analog to digital converter (ADC), a ½ frequency divider, and a ¼ frequency divider. In an embodiment, the P2V module and the ADC function to learn the frequency response of the PLL to apply to the IIR module 104.

In this embodiment, when the RF transmitter 16 is in the Cartesian mode, the PLL 56 generates two oscillations 62, which are provided via the ½ and ¼ frequency divider modules, from a reference oscillation (not shown). In particular, the phase-frequency detector (PFD) compares phase and/or frequency differences between the reference oscillation and a feedback oscillation to produce a difference signal. The charge pump (CP) converts the difference signal into an up or a down current signal. For example, the charge pump creates a down current signal to "slow down" the PLL when the phase and/or frequency of the feedback oscillation leads the phase and/or frequency of the reference oscillation and creates the up current signal to "speed up" the PLL when the phase and/or frequency of the feedback oscillation lags the phase and/or frequency of the reference oscillation. The loop filter (LF) converts the up or down current signal into a control voltage and limits the bandwidth of the PLL 56.

The VCO generates an output oscillation based on the control voltage, where the output oscillation is provided to the ½ divider, the ¼ frequency divider, the prescaler divider module, the phase to voltage (P2V) module (which is unused in this mode). The prescaler generates the feedback oscillation based on a divider value (which is fixed or adjustable within the prescaler) and a fractional divider value provided by the sigma delta modulator (ΣΔ). In the Cartesian mode, the sigma delta modulator does not receive phase modulation information 70 from the polar coordinate compensation module 20, thus the fractional divider value is not phase modulated.

When the RF transmitter 16 is in the polar mode, the PLL 56 operates as previously discussed but receive one-point phase modulation information (e.g., PM 70) or two-point phase modulation information (e.g., PM 70 and PM 70-2) from the polar coordinate compensation module 20. For one-point phase modulation, the PLL receives the phase modulation information 70 via the sigma delta modulator (ΣΔ). The phase modulation information 70 causes the fractional divider value to be phase modulated. As such, when the prescaler is generating the feedback oscillation, the feedback oscillation includes the phase modulation, which propagates to the oscillation resulting in the phase modulated oscillation 64 being outputted via the ½ and ¼ frequency dividers.

The polar compensation module 20 produces the compensated phase modulation information 70 and/or 70-2 by compensating phase distortion of the phase modulation information 36P and also produces the compensated amplitude modulation information 72 by compensating amplitude distortion of the amplitude modulation information 36A. To produce the compensated phase modulation information 70 and/or 70-2, the phase modulation information 36P is received by summing module 92, which may be a digital adder and/or programmed addition function.

The summing module 92 sums the phase modulation information 36P with first compensated AM information to produce AM compensated phase modulation information. The AM to PM correction module 90 generates the first compensated AM information, which is representative of an unwanted AM to PM conversion signal. The unwanted AM to PM conversion signal is produced as a result of unwanted phase components in the outbound RF signal, where the unwanted phase components are produced by power amplifier module 24 while amplifying the phase modulated oscillation based on amplitude modulation information 36A. As such, the AM compensated phase modulation information is the phase modulation information 36P with predistortion to compensate for the unwanted AM to PM conversion signal.

The phase to frequency module 94 differentiates the AM compensated phase modulation information to produce differentiated AM compensated phase modulation information. In general, the function of the phase to frequency module 94 is to compensate for the integration function of the VCO within the PLL such that the phase signal is preserved. In other words, the phase to frequency module 94 converts the AM compensated phase modulation information into a signaling convention that mimics a frequency input of the PLL.

The phase adjust module 96 produces error adjusted phase modulation information in accordance with the differentiated AM compensated phase modulation information and PLL estimation information from the PLL estimator 102. The PLL estimation information is produced based on information received from the PLL 56. For instance, the phase to voltage (P2V) module converts the output oscillation of the VCO into a voltage, which corresponds to the control voltage the VCO uses to generate the output oscillation. The ADC converts the voltage into a digital value that is low pass filtered by filter 100. The PLL estimator 102 utilizes the filtered digital value to estimate operational characteristics (e.g., PLL gain, Kv of VCO [voltage to oscillation ratio curve], PLL close loop transfer function, etc.) of the PLL 56, which is provided to the phase adjust module 96 as the PLL estimation information. In an embodiment, this path (e.g., the P2V, ADC, filter 100 and PLL estimator 102) measures the PLL and determine its transfer function so that an inverse transfer function can be applied by the IIR filter 104. In addition, for two point modulation, the PLL estimator 102 may be used to determine the gain needed for each phase modulation path to obtain a substantially flat combined transfer function.

For single point phase modulation, the IIR prediction module 104 receives the output of the phase adjust module 96 and the PLL estimation information from the PLL estimator 102 to produce compensated PM data that is adjusted in time by the time adjust module 98 to produce compensating PM information 70. In general, the function of the IIR prediction module is to compensate for the PLL's low pass transfer function. For two-point phase modulation, the IIR prediction module 104 is by-passed. The second point of phase modulation is also provided by the timing adjust module 98 via the DAC 105 to the VCO of the PLL. In two point modulation the first point (SD mod) has a low pass characteristic and the second (VCO input) a high pass characteristic such that, when combined, an all-pass transfer function (no signal loss) is achieved.

The timing adjust module 98 synchronizes the error adjusted phase modulation information with the error adjusted amplitude modulation information (discussed below) to produce compensated phase modulation information and compensated amplitude modulation information. In general, the timing adjust module 98 keeps the phase modulation information and amplitude modulation information of an outbound symbol aligned in time.

The polar coordinate compensation module 20 also compensates the amplitude modulation information 36A, which is received by the magnitude adjust module 106. The magnitude adjust module 106 substantially removes magnitude distortions of the amplitude modulation information 36A to produce error adjusted amplitude modulation information. As discuss above, the timing adjust module 98 synchronizes the error adjusted phase modulation information with the error adjusted amplitude modulation information to produce compensated phase modulation information and compensated amplitude modulation information. If the PA module 24 is linear, then the output of the timing adjust module 98 may be used as the compensated amplitude modulation signal 72.

If, however, the PA module 24 is non-linear, which may be used for data modulation schemes that have a constant phase and constant envelope (e.g., GMSK), then an AM to AM conversion may occur, which adds further distortion to the desired signal. In this instance, the input of the timing adjust module 98 is further compensated by an AM to AM correction module 108 that further functions to reduce the AM to AM conversion component of the outputted AM signal 72.

To gradually ramp up and/or down the PA module 24, a ramp signal produced by the PA ramp module 110 may be added to the AM to AM compensated signal to produce the desired AM output signal 72 (i.e., the compensated amplitude modulation information).

Figure 7:
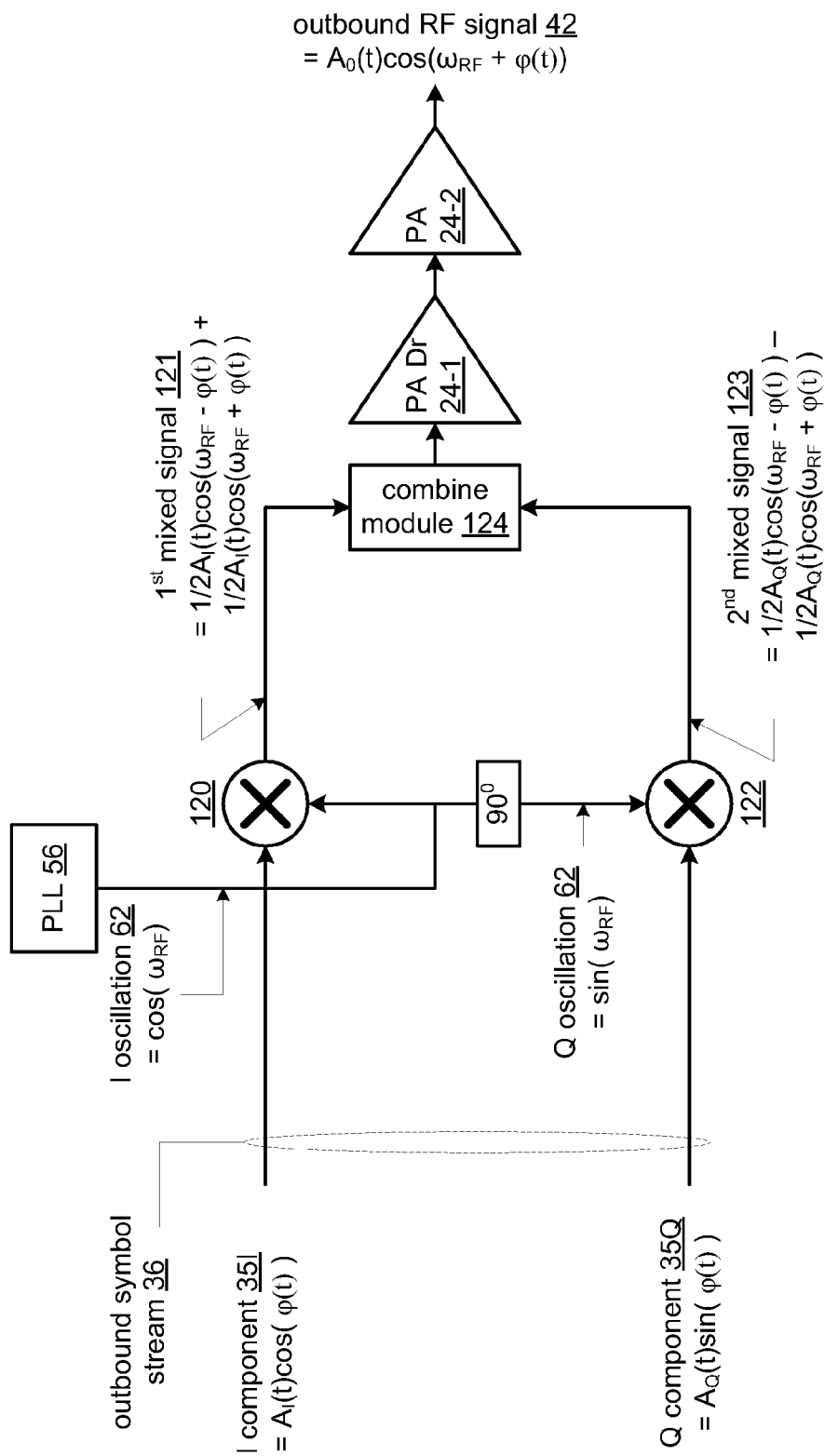
FIG. 7 is a functional block diagram of an embodiment of an up-conversion module in accordance with the present invention.

FIG. 7 is a functional block diagram of an embodiment of an up-conversion module 22 coupled to the PA module 24 in the Cartesian mode. The up-conversion module 22 includes a first mixer 120, a second mixer 122, and a combining module 124. The PA module 24 includes a PA driver 24-1 and a power amplifier 24-2. In an embodiment, the PA driver 24-1 is on-chip with the up-conversion module 22 and the PA 24-2 is off-chip. In another embodiment, the PA module 24 is on-chip with the up-conversion module 22. In yet another embodiment, the PA module 24 is off-chip from the up-conversion module 22.

In this mode, the first mixer 120 mixes the I component 36I of the inbound Cartesian symbol stream 36 with the I component of the local oscillation 62, which is derived from the oscillation produced by the PLL 56, to produce a first mixed signal 121. For example, if the I component 36I is expressed as $A_I(t)\cos(\phi(t))$ and the I component of the local oscillation is expressed as $\cos(\omega_{RF}(t))$ then the first mixed signal is the product of these signals, which can be expressed as $\frac{1}{2}*A_I(t)\cos(\omega_{RF}(t)+\phi(t))+\frac{1}{2}*A_I(t)\cos(\omega_{RF}(t)-\phi(t))$, where $A_I(t)$ represents the amplitude of the I component, $\omega_{RF}$ represents $2\pi*$the frequency of the oscillation, and $\phi$ represents the phase of the subchannel of the data of the I component.

The second mixer 122 mixes the Q component 36Q of the inbound Cartesian symbol stream 36 with the Q component of the local oscillation 62, which is derived from the oscillation produced by the PLL 56, to produce a second mixed signal 123. For example, if the Q component 36Q is express as $A_Q(t)\sin(\phi(t))$ and the Q component of the local oscillation is expressed as $\sin(\omega_{RF}(t))$ then the second mixed signal is the product of these signals, which can be expressed as $\frac{1}{2}*A_Q(t)\cos(\omega_{RF}(t)+\phi(t))-\frac{1}{2}*A_Q(t)\cos(\omega_{RF}(t)-\phi(t))$, where $A_Q(t)$ represents the amplitude of the Q component, $\omega_{RF}$ represents $2\pi*$the frequency of the oscillation, and $\omega_{dn}$ represents the frequency of the phase of the data of the Q component.

The combining module 124 combines the first and second mixed signals to produce the outbound RF signal 42, which is subsequently amplified via the power amplifier driver 24-1 and the power amplifier 24-2. Continuing with the above mathematical expressions, the combining module combines the first mixed signal [e.g., $\frac{1}{2}*A_I(t)\cos(\omega_{RF}(t)+\phi(t))+\frac{1}{2}*A_I(t)\cos(\omega_{RF}(t)-\phi(t))$] with the second mixed signal [e.g., $\frac{1}{2}*A_Q(t)\cos(\omega_{RF}(t)+\phi(t))-\frac{1}{2}*A_Q(t)\cos(\omega_{RF}(t)-\phi(t))$] to produce the outbound RF signal as $A_0(t)\cos(\omega_{RF}(t))+\phi(t))$, where $$A_0(t) = \sqrt{A_I(t)^2 + A_Q(t)^2}$$

$$\phi(t) = \tan^{-1}\frac{A_Q(t)}{A_I(t)}$$

Figure 8:
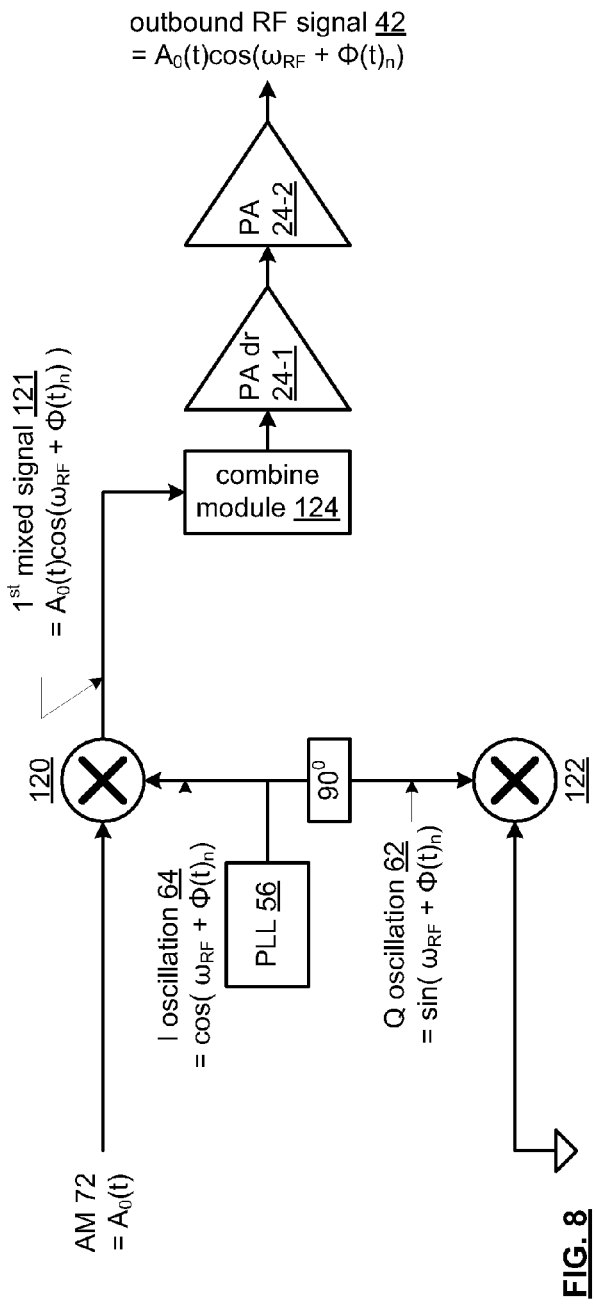
FIG. 8 is a functional block diagram of another embodiment of an up-conversion module in accordance with the present invention.

FIG. 8 is a functional block diagram of another embodiment of an up-conversion module 22 coupled to the PA module 24 in the polar mode. The up-conversion module 22 includes a first mixer 120, a second mixer 122, and a combining module 124. The PA module 24 includes a PA driver 24-1 and a power amplifier 24-2.

In this mode, the second mixer is disabled and the first mixer 120 mixes an analog representation of the amplitude modulation information $A_0(t)$ with the phase modulated oscillation 64, which may be expressed as $\cos(\omega_{RF}(t))+\Phi(t))$, where $\Phi(t)$ corresponds to the phase modulation information. The resulting mixed signal 121 may be expressed as $A_0(t)\cos(\omega_{RF}(t))+\Phi(t))$, which is passed by the combining module 124 to the power amplifier module 24-1 and 24-2. The power amplifier module 24 amplifies the signal to produce the outbound RF signal 42.

Figure 9:
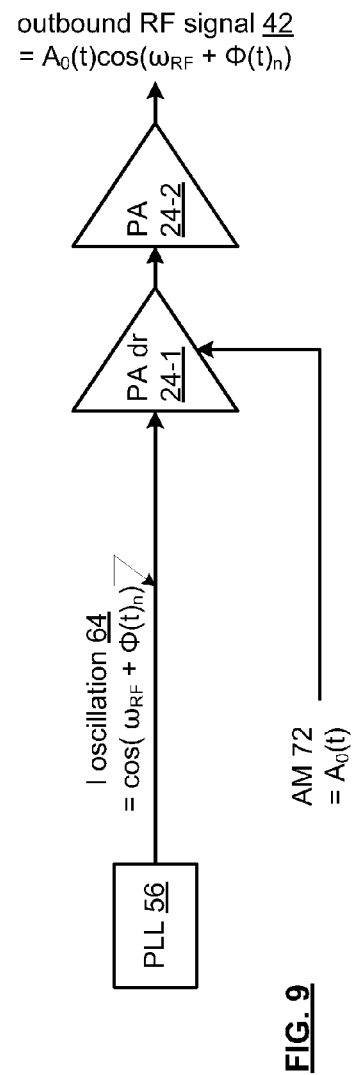
FIG. 9 is a functional block diagram of another embodiment of an up-conversion module in accordance with the present invention.

FIG. 9 is a functional block diagram of another embodiment of an up-conversion module 22 coupled to the PA module 24 in the polar mode. The up-conversion module 22 includes the PLL 56 and the PA module 24 includes a PA driver 24-1 and a power amplifier 24-2.

In this mode, the phase modulated oscillation 64, which may be expressed as $\cos(\omega_{RF}(t))+\Phi(t))$ where $\Phi(t)$ corresponds to the phase modulation information, is provided to the PA driver 24-1. The PA driver 24-1 amplifies the phase modulated oscillation 64 in accordance with an analog representation of the amplitude modulation information 72 $A_O(t)$ to produce an RF signal that may be expressed as $A_O(t)\cos(\omega_{RF}(t))+\Phi(t))$. The power amplifier 24-2 amplifies the signal to produce the outbound RF signal 42. Note that the amplitude modulation information 72 may be provided to the power amplifier 24-2 instead of the PA driver 24-1. Further note that the amplitude modulation information 72 may be provided to both the PA driver 24-1 and the power amplifier 24-2.

Figure 10:
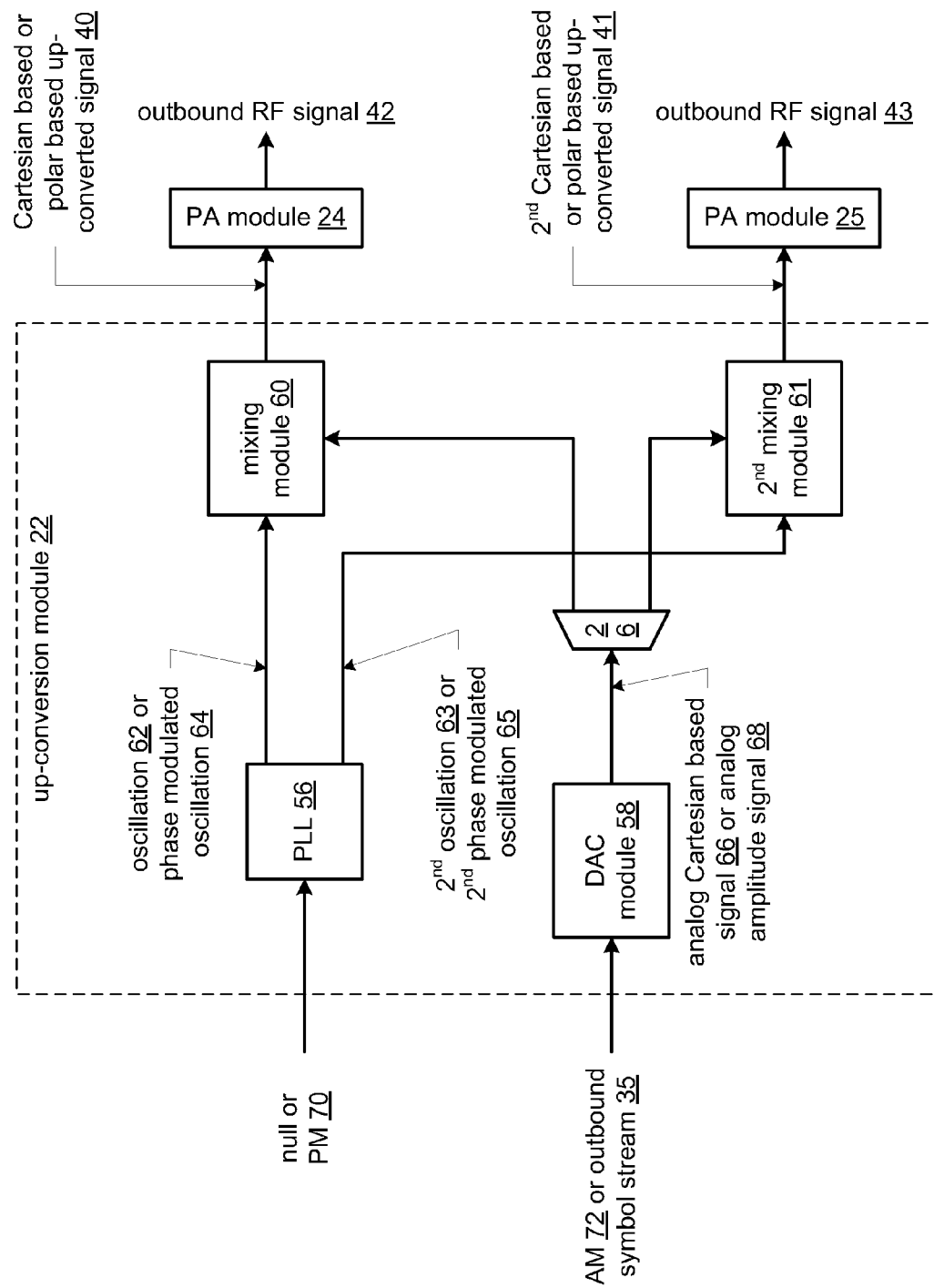
FIG. 10 is a functional block diagram of another embodiment of an up-conversion module in accordance with the present invention.

FIG. 10 is a functional block diagram of another embodiment of an up-conversion module 22 coupled to two PA modules 24 and 25. In this embodiment, the up-conversion module 22 includes the PLL 56, the DAC module 56, a first mixing module 60, a second mixing module 61, and multiplexing circuitry 26. The PLL 56 generates first and second oscillations 62 and 63 when the RF transmitter is in the Cartesian mode and generates first and second phase modulated oscillations based on the PM information 70 when the RF transmitter is in the polar mode.

In the Cartesian mode, the multiplexing circuitry 26 provides the analog Cartesian based signal 66 to the first or the second mixing module 60 or 61. When the RF transmitter is in a first Cartesian mode, the analog Cartesian based signal 66 will be provided to the first mixing module 60, which mixes the signal 66 with the oscillation 62 to produce the outbound RF signal 42, which is within a first frequency band (e.g., 800-900 MHz). When the RF transmitter is in a second Cartesian mode, the analog Cartesian based signal 66 will be provided to the second mixing module 61, which mixes the signal 66 with the second oscillation 63 to produce the outbound RF signal 43, which is within a second frequency band (e.g., 1800-2100 MHz).

In the polar mode, the multiplexing circuitry 26 provides the analog amplitude signal 68 to the first or the second mixing module 60 or 61. When the RF transmitter is in a first polar mode, the analog amplitude signal 68 will be provided to the first mixing module 60, which mixes the signal 68 with the phase modulated oscillation 64 to produce the outbound RF signal 42, which is within a first frequency band (e.g., 800-900 MHz). When the RF transmitter is in a second polar mode, the analog amplitude signal 68 will be provided to the second mixing module 61, which mixes the signal 68 with the second phase modulated oscillation 65 to produce the outbound RF signal 43, which is within a second frequency band (e.g., 1800-2100 MHz).

Figure 11:
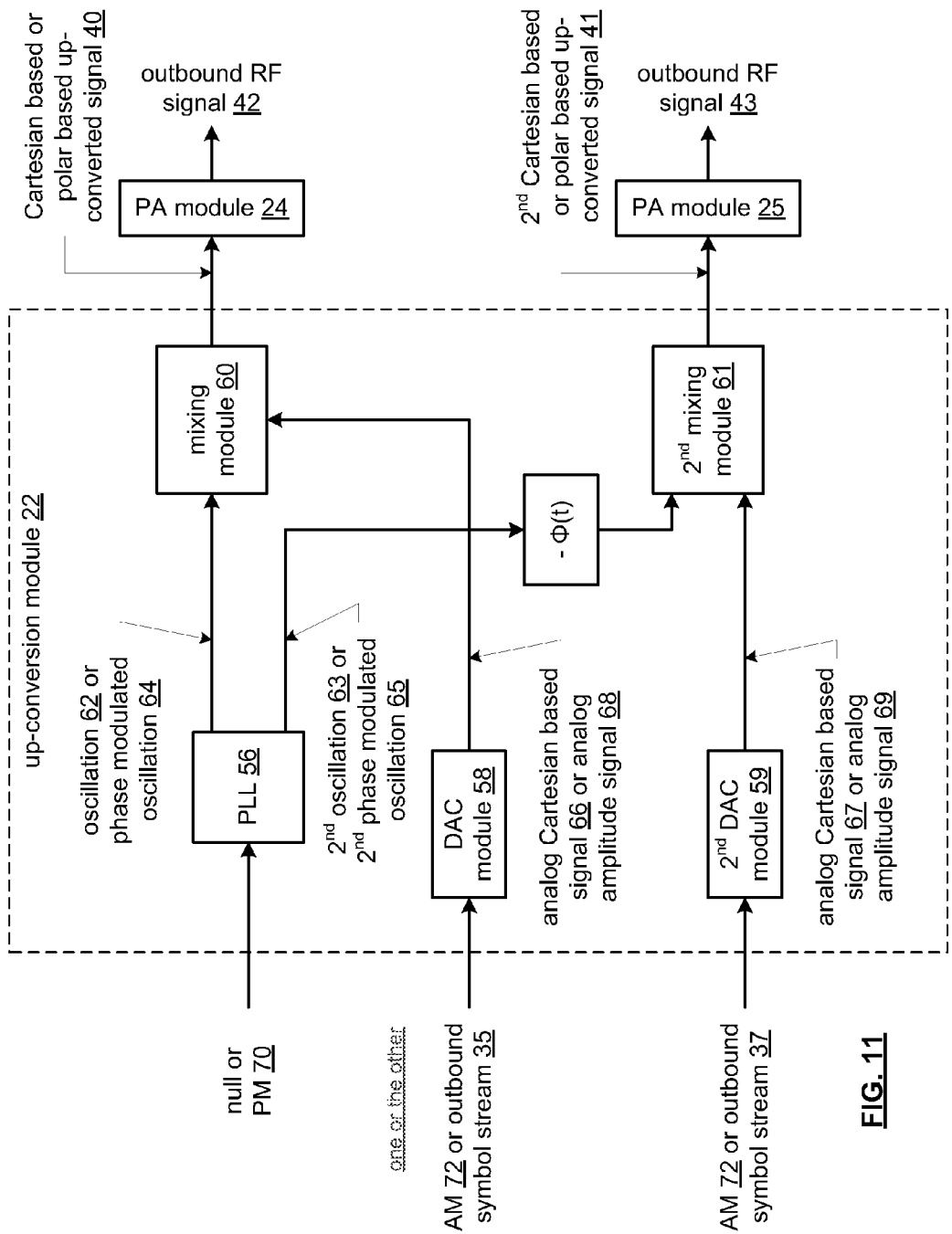
FIG. 11 is a functional block diagram of another embodiment of an up-conversion module in accordance with the present invention.

FIG. 11 is a functional block diagram of another embodiment of an up-conversion module 22 coupled to two PA modules 24 and 25. In this embodiment, the up-conversion module 22 includes the PLL 56, the DAC module 56, a second DAC module 59, the first mixing module 60, the second mixing module 61, and an inverse phase module ($-\Phi(t)$). The PLL 56 generates first and second oscillations 62 and 63 when the RF transmitter is in the Cartesian mode and generates first and second phase modulated oscillations based on the PM information 70 when the RF transmitter is in the polar mode.

In this embodiment, the up-conversion module 22 may be used to produce two outbound RF signals 42 and 43 simultaneously, with the first outbound RF signal 42 being within one frequency band and the second outbound RF signal 43 being in a second frequency band. In one configuration, the up-conversion module receives PM information 70 and AM information 72 for one signal and an outbound symbol stream 35 or 37 for the second signal. In this configuration, the PLL 56 generates first and second phase modulation oscillations 64 and 65. The first phase modulated oscillation 64 is provided to the first mixing module 60, which mixes the oscillation 64 with the analog amplitude signal 60 to produce the first outbound RF signal 42.

Also in this configuration, the second DAC 59 converts the second outbound symbol stream 37 into a second analog Cartesian based signal 67, which is provided to the second mixing module 61. The phase inverse module substantially removes the phase modulation information 70 from the phase modulation oscillation 65 to substantially reproduce the second oscillation 63. The second mixing module 61 mixes the second Cartesian based signal 67 with the second oscillation 63 to produce the second outbound RF signal 43.

In another configuration, the PLL receives null phase modulation information and thus generates the first and second oscillations 62 and 63. The first mixing module 60 mixes the analog Cartesian based signal 66 with the first oscillation 62 to produce the first outbound RF signal 42 and the second mixing module 61 mixes the analog Cartesian based signal 67 with the second oscillation 63 to produce the second outbound RF signal 43.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "coupled to" and/or "coupling" and/or includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" indicates that an item includes one or more of power connections, input(s), output (s), etc., to perform one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

What is claimed is:

1. A radio frequency (RF) transmitter comprises:
   a Cartesian to polar conversion module, when enabled, coupled to convert an in-phase component and a quadrature component of an outbound symbol stream into a polar coordinate;
   a polar coordinate compensation module, when enabled, coupled to compensate the polar coordinate based on at least one of timing errors, amplitude distortion, and phase distortion to produce a compensated polar coordinate, wherein the polar coordinate compensation module includes:
      a phase compensation module coupled to compensate the phase distortion of phase modulation information of the polar coordinate to produce compensated phase modulation information;
      an amplitude compensation module to compensate the amplitude distortion of amplitude modulation information of the polar coordinate to produce compensated amplitude modulation information; and
      a time adjust module coupled to substantially synchronize the compensated amplitude modulation information and the compensated phase modulation information to produce the compensated polar coordinate;
   a phase locked loop (PLL) coupled to:
      generate an oscillation when the RF transmitter is in a Cartesian mode; and
      generate a phase modulated oscillation in accordance with phase modulation information of the compensated polar coordinate when the RF transmitter is in a polar mode;
   an IQ up-conversion section coupled to:
      mix an in-phase component of a local oscillation with the in-phase component to produce a first mixed signal when the RF transmitter is in the Cartesian mode, wherein the local oscillation is derived from the oscillation;
      mix a quadrature component of the local oscillation with the quadrature component to produce a second mixed signal when the RF transmitter is in the Cartesian mode; and
      combine the first and second mixed signals to produce a Cartesian based up-converted signal when the RF transmitter is in the Cartesian mode;
   a power amplifier module coupled to:
      amplify the Cartesian based up-converted signal to produce an outbound RF signal when the RF transmitter is in the Cartesian mode; and
      amplify a polar based up-converted signal to produce the outbound RF signal when the RF transmitter is in the polar mode, wherein the polar based up-converted signal is based on the phase modulated oscillation and amplitude modulation information of the compensated polar coordinate.

2. The RF transmitter of claim 1 further comprises:
   the Cartesian to polar conversion module receiving, for a packet of a transmission, an enabling signal, wherein, in response to the enabling signal, the Cartesian to polar conversion module converts the in-phase component and the quadrature component of the outbound symbol stream of the packet into the polar coordinate.

3. The RF transmitter of claim 1, wherein the power amplifier module comprises:
   a first power amplifier structure to amplify the Cartesian based up-converted signal to produce the outbound RF signal when the RF transmitter is in the Cartesian mode; and
   a second power amplifier structure to amplify the phase modulated oscillation in accordance with amplitude modulation information of the compensated polar coordinate to produce the outbound RF signal when the RF transmitter is in the polar mode.

4. The RF transmitter of claim 1, wherein the power amplifier module comprises:
   a power amplifier driver coupled to pre-amplify the Cartesian based up-converted signal or the phase modulated oscillation to produce a pre-amplified outbound RF signal; and
   a power amplifier operable in a first mode to linearly amplify the pre-amplified outbound RF signal to produce the outbound RF signal and operable in a second mode to non-linearly amplify the pre-amplified outbound RF signal to produce the outbound RF signal.

5. The RF transmitter of claim 1 further comprises:
   the PLL coupled to generate a second phase modulated oscillation in accordance with the phase modulation information of the compensated polar coordinate when the RF transmitter is in a second polar mode;
   a second IQ up-conversion section, when enabled, coupled to:
      mix an in-phase component of a second local oscillation with an in-phase component of a second outbound symbol stream to produce an in-phase mixed signal, wherein the second local oscillation is derived from the oscillation;
      mix a quadrature component of the second local oscillation with a quadrature component of the second outbound symbol stream to produce a quadrature mixed signal; and
      combine the in-phase and quadrature mixed signals to produce a second Cartesian based up-converted signal;
   the power amplifier module coupled to:
      amplify the second Cartesian based up-converted signal to produce a second outbound RF signal when the RF transmitter is in a second Cartesian mode; and
      amplify the second phase modulated oscillation in accordance with amplitude modulation information of the compensated polar coordinate to produce the second outbound RF signal when the RF transmitter is in the second polar mode.

6. The RF transmitter of claim 1 further comprises:
   the PLL coupled to generate a second phase modulated oscillation in accordance with phase modulation information of the compensated polar coordinate when the RF transmitter is in a second polar mode;

the power amplifier module coupled to amplify the Cartesian based up-converted signal to produce an outbound RF signal when the RF transmitter is in the Cartesian mode and the second polar mode; and a second power amplifier module coupled to amplify the second phase modulated oscillation in accordance with amplitude modulation information of the compensated polar coordinate to produce a second outbound RF signal when the RF transmitter is in the Cartesian mode and the second polar mode.

7. A radio frequency (RF) transmitter comprises:

a Cartesian to polar conversion module, when enabled, coupled to convert an in-phase component and a quadrature component of an outbound symbol stream into a polar coordinate;

a polar coordinate compensation module, when enabled, coupled to compensate the polar coordinate based on at least one of timing errors, amplitude distortion, and phase distortion to produce a compensated polar coordinate, wherein the polar coordinate compensation module includes:

an amplitude modulation (AM) to phase modulation (PM) correction module coupled to compensate amplitude induced phase distortion of the polar coordinate to produce first compensated AM information;

a first summing module coupled to sum phase modulation information of the polar coordinate with the first compensated AM information to produce AM compensated phase modulation information;

a phase to frequency module coupled to differentiate the AM compensated phase modulation information to produce differentiated AM compensated phase modulation information;

a phase adjust module coupled to produce error adjusted phase modulation information in accordance with the differentiated AM compensated phase modulation information and PLL estimation information;

a magnitude adjust module to produce error adjusted amplitude modulation information;

a timing adjust module coupled to synchronize the error adjusted phase modulation information and the error adjusted amplitude modulation information to produce compensated phase modulation information and compensated amplitude modulation information;

a PLL estimator module coupled to generate the PLL estimation information based on feedback from the PLL; and an AM to AM correction module coupled to generate an amplitude modulation signal based on the compensated amplitude modulation information;

a phase locked loop (PLL) coupled to:

generate an oscillation when the RF transmitter is in a Cartesian mode; and generate a phase modulated oscillation in accordance with phase modulation information of the compensated polar coordinate when the RF transmitter is in a polar mode;

an IQ up-conversion section coupled to:

mix an in-phase component of a local oscillation with the in-phase component to produce a first mixed signal when the RF transmitter is in the Cartesian mode, wherein the local oscillation is derived from the oscillation;

mix a quadrature component of the local oscillation with the quadrature component to produce a second mixed signal when the RF transmitter is in the Cartesian mode; and combine the first and second mixed signals to produce a Cartesian based up-converted signal when the RF transmitter is in the Cartesian mode;

a power amplifier module coupled to:

amplify the Cartesian based up-converted signal to produce an outbound RF signal when the RF transmitter is in the Cartesian mode; and amplify a polar based up-converted signal to produce the outbound RF signal when the RF transmitter is in the polar mode, wherein the polar based up-converted signal is based on the phase modulated oscillation and amplitude modulation information of the compensated polar coordinate.

8. The RF transmitter of claim 7 further comprises:

the Cartesian to polar conversion module receiving, for a packet of a transmission, an enabling signal, wherein, in response to the enabling signal, the Cartesian to polar conversion module converts the in-phase component and the quadrature component of the outbound symbol stream of the packet into the polar coordinate.

9. The RF transmitter of claim 7, wherein the power amplifier module comprises:

a first power amplifier structure to amplify the Cartesian based up-converted signal to produce the outbound RF signal when the RF transmitter is in the Cartesian mode; and a second power amplifier structure to amplify the phase modulated oscillation in accordance with amplitude modulation information of the compensated polar coordinate to produce the outbound RF signal when the RF transmitter is in the polar mode.

10. The RF transmitter of claim 7, wherein the power amplifier module comprises:

a power amplifier driver coupled to pre-amplify the Cartesian based up-converted signal or the phase modulated oscillation to produce a pre-amplified outbound RF signal; and a power amplifier operable in a first mode to linearly amplify the pre-amplified outbound RF signal to produce the outbound RF signal and operable in a second mode to non-linearly amplify the pre-amplified outbound RF signal to produce the outbound RF signal.

11. The RF transmitter of claim 7 further comprises:

the PLL coupled to generate a second phase modulated oscillation in accordance with the phase modulation information of the compensated polar coordinate when the RF transmitter is in a second polar mode;

a second IQ up-conversion section, when enabled, coupled to:

mix an in-phase component of a second local oscillation with an in-phase component of a second outbound symbol stream to produce an in-phase mixed signal, wherein the second local oscillation is derived from the oscillation;

mix a quadrature component of the second local oscillation with a quadrature component of the second outbound symbol stream to produce a quadrature mixed signal; and combine the in-phase and quadrature mixed signals to produce a second Cartesian based up-converted signal;

the power amplifier module coupled to:

amplify the second Cartesian based up-converted signal to produce a second outbound RF signal when the RF transmitter is in a second Cartesian mode; and amplify the second phase modulated oscillation in accordance with amplitude modulation information of the compensated polar coordinate to produce the second outbound RF signal when the RF transmitter is in the second polar mode.

12. The RF transmitter of claim 7 further comprises:
the PLL coupled to generate a second phase modulated oscillation in accordance with phase modulation information of the compensated polar coordinate when the RF transmitter is in a second polar mode;

the power amplifier module coupled to amplify the Cartesian based up-converted signal to produce an outbound RF signal when the RF transmitter is in the Cartesian mode and the second polar mode; and a second power amplifier module coupled to amplify the second phase modulated oscillation in accordance with amplitude modulation information of the compensated polar coordinate to produce a second outbound RF signal when the RF transmitter is in the Cartesian mode and the second polar mode.

13. A radio frequency (RF) transmitter comprises:
a Cartesian to polar conversion module, when enabled, coupled to convert an in-phase component and a quadrature component of an outbound symbol stream into a polar coordinate, the Cartesian to polar conversion module receiving, for a packet of a transmission, an enabling signal, wherein, in response to the enabling signal, the Cartesian to polar conversion module converts the in-phase component and the quadrature component of the outbound symbol stream of the packet into the polar coordinate;

a polar coordinate compensation module, when enabled, coupled to compensate the polar coordinate based on at least one of timing errors, amplitude distortion, and phase distortion to produce a compensated polar coordinate;

a phase locked loop (PLL) coupled to:
generate an oscillation when the RF transmitter is in a Cartesian mode; and
generate a phase modulated oscillation in accordance with phase modulation information of the compensated polar coordinate when the RF transmitter is in a polar mode;

an IQ up-conversion section coupled to:
mix an in-phase component of a local oscillation with the in-phase component to produce a first mixed signal when the RF transmitter is in the Cartesian mode, wherein the local oscillation is derived from the oscillation;
mix a quadrature component of the local oscillation with the quadrature component to produce a second mixed signal when the RF transmitter is in the Cartesian mode; and
combine the first and second mixed signals to produce a Cartesian based up-converted signal when the RF transmitter is in the Cartesian mode;

a power amplifier module coupled to:
amplify the Cartesian based up-converted signal to produce an outbound RF signal when the RF transmitter is in the Cartesian mode; and
amplify a polar based up-converted signal to produce the outbound RF signal when the RF transmitter is in the polar mode, wherein the polar based up-converted signal is based on the phase modulated oscillation and amplitude modulation information of the compensated polar coordinate.

14. The RF transmitter of claim 13, wherein the polar coordinate compensation module comprises:
a phase compensation module coupled to compensate the phase distortion of phase modulation information of the polar coordinate to produce compensated phase modulation information;
an amplitude compensation module to compensate the amplitude distortion of amplitude modulation information of the polar coordinate to produce compensated amplitude modulation information; and
a time adjust module coupled to substantially synchronize the compensated amplitude modulation information and the compensated phase modulation information to produce the compensated polar coordinate.

15. The RF transmitter of claim 13, wherein the polar coordinate compensation module comprises:
an amplitude modulation (AM) to phase modulation (PM) correction module coupled to compensate amplitude induced phase distortion of the polar coordinate to produce first compensated AM information;
a first summing module coupled to sum phase modulation information of the polar coordinate with the first compensated AM information to produce AM compensated phase modulation information;
a phase to frequency module coupled to differentiate the AM compensated phase modulation information to produce differentiated AM compensated phase modulation information;
a phase adjust module coupled to produce error adjusted phase modulation information in accordance with the differentiated AM compensated phase modulation information and PLL estimation information;
a magnitude adjust module to produce error adjusted amplitude modulation information;
a timing adjust module coupled to synchronize the error adjusted phase modulation information and the error adjusted amplitude modulation information to produce compensated phase modulation information and compensated amplitude modulation information;
a PLL estimator module coupled to generate the PLL estimation information based on feedback from the PLL; and
an AM to AM correction module coupled to generate an amplitude modulation signal based on the compensated amplitude modulation information.

16. The RF transmitter of claim 15, wherein the polar coordinate compensation module further comprises:
a power amplifier ramp module coupled to generate a ramp signal; and
a second summing module coupled to sum the ramp signal with the compensated amplitude modulation information.

17. The RF transmitter of claim 13, wherein the power amplifier module comprises:
a first power amplifier structure to amplify the Cartesian based up-converted signal to produce the outbound RF signal when the RF transmitter is in the Cartesian mode; and
a second power amplifier structure to amplify the phase modulated oscillation in accordance with amplitude modulation information of the compensated polar coordinate to produce the outbound RF signal when the RF transmitter is in the polar mode.

18. The RF transmitter of claim 13, wherein the power amplifier module comprises:
- a power amplifier driver coupled to pre-amplify the Cartesian based up-converted signal or the phase modulated oscillation to produce a pre-amplified outbound RF signal; and
- a power amplifier operable in a first mode to linearly amplify the pre-amplified outbound RF signal to produce the outbound RF signal and operable in a second mode to non-linearly amplify the pre-amplified outbound RF signal to produce the outbound RF signal.

19. The RF transmitter of claim 13 further comprises:
the PLL coupled to generate a second phase modulated oscillation in accordance with the phase modulation information of the compensated polar coordinate when the RF transmitter is in a second polar mode;
a second IQ up-conversion section, when enabled, coupled to:
- mix an in-phase component of a second local oscillation with an in-phase component of a second outbound symbol stream to produce an in-phase mixed signal, wherein the second local oscillation is derived from the oscillation;
- mix a quadrature component of the second local oscillation with a quadrature component of the second outbound symbol stream to produce a quadrature mixed signal; and
- combine the in-phase and quadrature mixed signals to produce a second Cartesian based up-converted signal;

the power amplifier module coupled to:
- amplify the second Cartesian based up-converted signal to produce a second outbound RF signal when the RF transmitter is in a second Cartesian mode; and
- amplify the second phase modulated oscillation in accordance with amplitude modulation information of the compensated polar coordinate to produce the second outbound RF signal when the RF transmitter is in the second polar mode.

20. The RF transmitter of claim 13 further comprises:
the PLL coupled to generate a second phase modulated oscillation in accordance with phase modulation information of the compensated polar coordinate when the RF transmitter is in a second polar mode;
the power amplifier module coupled to amplify the Cartesian based up-converted signal to produce an outbound RF signal when the RF transmitter is in the Cartesian mode and the second polar mode; and
a second power amplifier module coupled to amplify the second phase modulated oscillation in accordance with amplitude modulation information of the compensated polar coordinate to produce a second outbound RF signal when the RF transmitter is in the Cartesian mode and the second polar mode.

\* \* \* \* \*